United States Patent Office 3,353,475
Patented Nov. 21, 1967

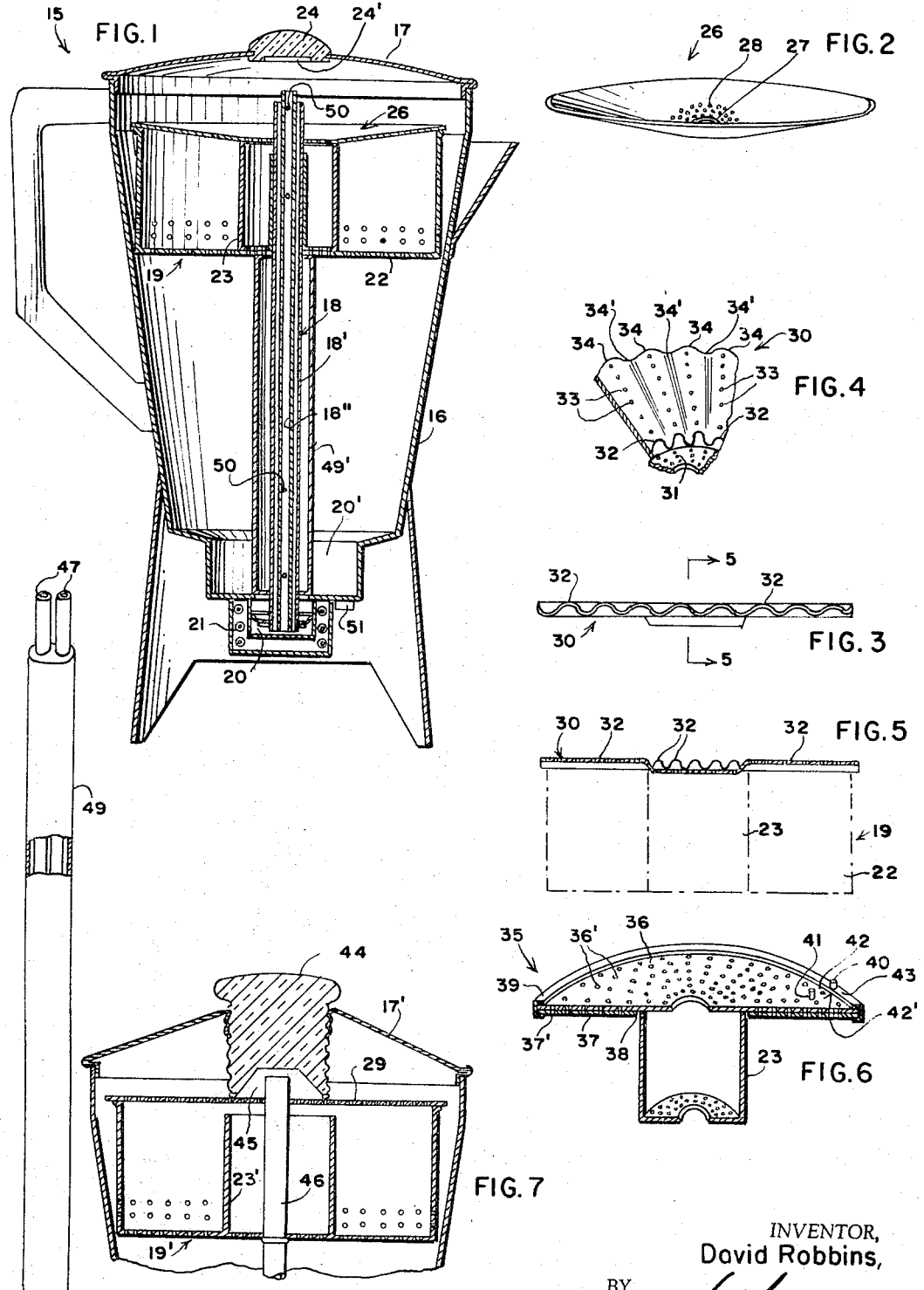
Nov. 21, 1967     D. ROBBINS     3,353,475
BEVERAGE BREWERS, COFFEE PERCOLATORS AND THE LIKE
Filed April 23, 1965
INVENTOR,
David Robbins,
BY
ATTORNEY.

3,353,475
BEVERAGE BREWERS, COFFEE PERCOLATORS
AND THE LIKE
David Robbins, 7 Dogleg Lane,
Roslyn Heights, N.Y. 11577
Filed Apr. 23, 1965, Ser. No. 450,458
5 Claims. (Cl. 99—312)

The present invention relates to beverage brewers, coffee percolators and the like.

An object of this invention is to provide a novel and improved beverage maker of comparatively large capacity which is readily convertible into one of small capacity, offering appreciable depth of the grounds and confinement of the liquid flowing therethrough when arranged to make two or three cups instead of eight to thirty cups which may be its full capability; such amounts being stated as a mere example to indicate the scope of applicability of this invention.

When grounds sufficient for making only two or three cups is put into the strainer cup of a percolator designed for a much larger capacity, it is evident that the grounds depth is extremely small. Seepage of liquid therethrough is rapid and there is very little absorption. Operation of the device can continue for quite a long time without attaining the required beverage strength. This invention overcomes this objection.

Further, in ordinary percolator devices, the hot liquid rising in the vertical delivery tube, is cooled by the cold liquid mass in the pot which takes some time to become hot. This delays the percolating action.

It is therefore another object of this invention to provide novel and improved structure to keep the liquid which rises in the delivery tube, from cooling off.

Another object of this invention is to provide novel and improved construction to obtain better dispersion of liquid and to increase the velocity thereof through said tube.

Another object thereof is to provide novel and improved attachments and constructions in percolators whereby with simple manipulations they are set into condition for either large or small capacity operation. Further, such arrangements are adaptable for use in existing percolators without change in their conventional structure.

Still another object of this invention is to provide novel and improved constructions of the character mentioned, which are simple to manufacture, reasonable in cost, easy to use and efficient in carrying out the purposes for which they are designed.

Other objects and advantages will become apparent as this disclosure proceeds.

For the practice of this invention, the strainer cup of a comparatively large capacity percolator is furnished with or is constructed to have a relatively small centrally positioned strainer cup or open-top strainer compartment which shall be referred to herein as the auxiliary strainer cup, and some sort of shielding means is provided which will keep the liquid dispersed by the surface presented a bit above the upper discharge end of the vertical delivery tube, confined or directed to enter only said auxiliary strainer cup. Such localization or both the grounds and liquid flow is mandatory to obtain efficient operation for the brewing of the smaller amount of beverage.

I also provide a jacket of warm water on the vertical delivery tube, to insulate it from the cold liquid in the pot by having two tubes one within the other, I also provide novel delivery tube structure to obtain an increase in the velocity of liquid therethrough, and to effect better dispersion of the liquid.

Embodiments of such constructions and various modifications thereof will now be described in detail, for which reference will be had to the accompanying drawing forming part of this specification, in which drawing, similar characters of reference indicate corresponding parts in all the views.

FIG. 1 is an elevational section taken through an electric beverage maker such as a coffee percolator, embodying the teachings of this invention. Other than the heating coil and the thermostat, remaining parts of the electrical system are omitted.

FIG. 2 is a perspective view of the shield member included in the apparatus shown in FIG. 1.

FIG. 3 is an elevational view of a shield member of modified construction.

FIG. 4 is a fragmentary perspective top view of FIG. 3.

FIG. 5 is a section taken at line 5—5 in FIG. 3, wherein said shield member of FIG. 3 is shown covering the strainer cup structure; the latter being indicated by dot-dash lines.

FIG. 6 is a fragmentary perspective view of another shield member. The auxiliary strainer cup is also shown.

FIG. 7 is a fragmentary section taken like FIG. 1, showing another form of shielding means.

FIG. 8 is a fragmentary perspective view, with a part broken away to expose interior parts, of a modified form of tube structure in which heated liquid rises for dispersion into the strainer cup structure.

In the drawing, a preferred form of coffee percolator indicated generally by the numeral 15, comprises a pot 16 having a removable cover 17, a centrally positioned vertical delivery tube structure denoted generally by the numeral 18 in which heated liquid rises with force and is discharged therefrom against the underside of the cover 17, whereby it is dispersed downwardly, and a grounds container which is a strainer cup structure designated generally by the numeral 19, supported on said tube in the upper part of the pot, so the mouth of said strainer cup structure is a bit below said tube's upper end. The lower end of said tube 18 is a bit above the bottom of the pot, which here is the bottom wall of a pit 20, around the wall of which, is the electric heating element 21.

The strainer cup structure comprises the ordinary large strainer cup 22 which is nearly the inside diameter of the pot in size, and a concentric smaller cup 23 therein which may be a separate member or merely a cylindrical wall welded in to make the inner compartment in the large cup 22. At least the floor walls of said cups are perforated, though it is preferred that the cylindrical wall of the auxiliary cup 23 shall have no perforations. The capacity of both strainer cups together, is sufficient to hold grounds for many cups of beverage to be brewed. The capacity of the auxiliary cup 23 is for holding grounds sufficient only for a few cups. Said strainer cups, of course, have central holes in their floor walls through which said tube 18 is positioned. A usual component of the cover 17, is an inset glass button 24.

When the percolator 15 is to be used for making a large amount of beverage for which it was designed, the pot 16 is filled with sufficient water and both the large and small compartments of the strainer structure 19 are filled with sufficient coffee grounds or other material for the brew. A perforated plate with a central hole of proper size, is placed on the tube structure 18 and is set as a cover resting on the mouth rim of the strainer cup 22, as in any ordinary percolator. However, when but a few cups of beverage are to be made, sufficient grounds therefor are put only into the auxiliary strainer cup 23, the pot is filled with water only to the extent necessary for such smaller amount, and of importance is, that some means be provided to confine the liquid coming to the cover 17 and dispersed downwardly, to enter only into the smaller strainer cup 23.

One manner to localize the flow of liquid into the strainer cup 23, is to have a shielding plate 26 with a sufficient central hole 27 so it can be placed on the tubing structure 18 and set on the mouth rim of the strainer cup 22. The part of the shield 26 which is directly over the mouth of the strainer cup 23, is perforated as shown at 28. The remainder of this shield has no perforations. This shield 26 is preferably dished a bit so liquid coming to it will flow towards center. So the percolator is provided with a fully perforated plate as shown at 29 in FIG. 7, and and a shield 26, only one of which is used at one time, depending upon the amount of beverage to be made.

In another shield designated generally by the numeral 30, the part thereof which is directly over the mouth of the smaller strainer cup 23, is perforated as at 31, and the remainder which is over the rest of the larger strainer cup 22, is formed with steep radial corrugations 32, only the alternate crests of which are provided with small perforations 33. When brewing a large quantity of beverage, this shield 30 is positioned with the perforated crests downward so liquid dispersed thereon will flow through the perforations 31 into the smaller strainer cup 23, and through the perforations 33 into the large strainer cup 22. When brewing a small quantity of beverage, the shield 30 is positioned with the perforated crests upward as shown in FIGS. 3 and 4. Dispersed liquid hitting the perforated crests 34 will sooner flow down into the unperforated crests 34', than pass through the perforations 33, because of the action of gravity and surface tension. Hence the water will flow along the inclined channels offered by the unperforated crests 34' and thence through the perforations 31, into the strainer cup 23.

In another shield designated generally by the numeral 35, there are two superposed plates 36 and 37 which are perforated, so in one position, the perforations 36' of the plate 36 are in register with the perforations 37' of the plate 37, but in another position, when one is rotated slightly on the other, the perforations 36' and 37' are out of registry. One of the plates, here shown to be the lower one, is provided with an opening 38, of a size just to admit the rim of the strainer cup 23. A circumferential edging 39 fixed to the lower plate 37, associates said pair of plates for relative circular movement, and the pins 40 fixed to said edging and 41 fixed to the plate 36, facilitate such movement. Markings 42, 42' and 43, aid in determining the positions of registry and non-registry. When the shield 35 is used for brewing a large amount of beverage, its plates are set so their perforations 36', 37' are in register whereby liquid will enter the entire strainer cup structure. When brewing a small quantity, said plates are set for their perforations to be out of registry, so liquid will enter only the smaller strainer cup.

In still another shield means as is shown in FIG. 7, the strainer cup structure 19' which is like 19 has a perforated plate 29 as in any ordinary percolator. The shielding is accomplished by an inverted cup structure which may be offered by a screw plug 44, preferably of glass or the like, threadedly engaged in the cover member 17', for movement along the vertical; said plug having a socket 45 in its bottom surface, into which liquid issuing from the tube 46, impinges; the shape of said socket being preferably frusto-conical, with its larger dimension at its mouth, and such mouth being about the same diameter as that of the mouth rim of the smaller strainer cup 23' When brewing a large quantity of beverage, said plug 44 is raised so liquid will flow into both strainer compartments. For brewing a small quantity, said plug is lowered as shown, so liquid will flow only into the smaller strainer compartment, for said plug is then very close or actually in contact with the plate 29.

To obtain a greater velocity for the flow of liquid up the tubular structure, passage of liquid is through two concentric tubes 18', 18" assembled by spaced transverse pins 50, or passage may be allowed up a plurality of small-bore adjacently positioned tubes 47, instead of one tube 46 which is ot comparatively large bore. The tubes 47 may be surrounded by an hermetically sealed air-containing jacket 49, whose upper end may serve to support the strainer cup structure 19. Separate spaced discharges from said tubes 47, compels impingement of liquid, not against one central part of the surface 24', but at two regions, each of which is off center. Hence there is better dispersion. Also to be noted, is that in the tube structure 18, the heater liquid in the outer tube 18', acts as a heat insulation for the liquid in the inner tube 18". The air jacket 49' in FIG. 1, may therefore be omitted.

The pit 20, which need be of extremely small volume relatively speaking, as is well known in the art, merely serves in the manner of a flash boiler holding very little liquid at any one time. For proper circulation, there must always be a sufficient head of liquid in the pot 16. When the area of the bottom wall is substantial, as is prevalent in conventional percolators generally, use of a small quantity of liquid as would be the case when the apparatus 15 is used for making but a few cups, employing the auxiliary strainer cup 23 for holding the coffee grounds, would give a head of very little height. In some instances, it is found that the heat soon vaporizes the liquid mass, filling the pot with steam and there would be no circulation of liquid through the strainer cup and of course, the pot's bottom would become unduly overheated. In electric percolators, the control thermostat 51 would soon be actuated to cut off the current supply to the heating coil 21. As time passes, some intermittent operation of the heating coil will ensue and percolator performance becomes chaotic and the process of brewing is stymied. To overcome such objectionable occurrences, there is the pit 20' of sufficient depth to hold substantially all of the liquid supply required when brewing only a few cups, and yet assure continuous circulation.

Teachings of this invention are applicable to beverage makers with built-in heating means and those which are set on a range to be heated. Existing beverage makers if suitable, may be fitted with a separate small size strainer cup and suitable shield means as taught herein, so they may be used for brewing their designed-for large capacity, or when desired, just to make a few cups of beverage.

This invention is capable of munerous forms and various applications without departing from the essential features herein disclosed. It is therefore intended and desired that the embodiments described herein shall be deemed merely illustrative and not restrictive and that the patent shall cover all patentable novelty herein set forth; reference being had to the following claims rather than to the specific showings and description herein to indicate the scope of this invention.

I claim:

1. In a beverage brewer, coffee percolator and the like, a pot, a main strainer cup of a diameter substantially that of the interior of said pot, an auxiliary strainer cup of substantially smaller diameter than said main strainer cup, centrally within said main strainer cup; only the bottom wall of said auxiliary strainer cup being perforated, a vertical tube passing centrally through both said strainer cups, a member mounted on the pot, presenting a surface above the upper end of said tube, to disperse downwardly, liquid discharged from the upper end of said tube and a shield means below said surface, affording passage of liquid dispersed by said surface only into said auxiliary strainer cup.

2. The apparatus as set forth in claim 1, wherein said shield means comprises an imperforated plate covering substantially that portion of the mouth of the main strainer cup which is between the mouth rim of said cups; the central portion of said plate over the mouth of the auxiliary strainer cup, being perforated.

3. The apparatus as set forth in claim 1, wherein said shield means comprises a plate covering the mouth of said main strainer cup; that portion of said plate which is over the mouth of the auxiliary strainer cup being perforated; the remaining portion of said plate being radially corrugated; the crests of alternate corrugations having perforations; the rest of said remaining portion of the plate, being imperforated; said plate when positioned inverted, also affording passage of liquid dispersed by said surface, through the perforations in said crests and into the main strainer cup.

4. The apparatus as set forth in claim 1, wherein said shield means comprises two superposed perforated plates whose perforations are in registry respectively; said plates being relatively axially rotatable; said plate covering the mouth of said main strainer cup; the perforations in those portions of said plates which are directly over the mouth of the auxiliary strainer cup, being always in registry at all relative positions of said plates; the perforations in the remainder of said plates, being out of registry when said plates are relatively turned a predetermined part of a turn.

5. The apparatus as set forth in claim 1, wherein the pot has a bottom pit into which the lower end portion of the tube extends; the volume of said pit being substantially sufficient to hold the small quantity of liquid required when only the auxiliary strainer member is used to hold solid granular material and the height of said pit being sufficient to avoid stoppage of circulation of the liquid through said tube when the pot carrying liquid is heated.

References Cited

UNITED STATES PATENTS

| | | | |
|---|---|---|---|
| 133,582 | 12/1872 | Hofman | 99—289 |
| 577,625 | 2/1897 | Royer | 99—313 X |
| 802,378 | 10/1905 | Ellis | 99—305 |
| 951,290 | 3/1910 | Selg | 99—284 |
| 1,778,792 | 10/1930 | Cameron | 99—284 |
| 2,583,279 | 1/1952 | Rudahl | 99—298 X |
| 2,718,844 | 9/1955 | Schwinger | 99—298 |
| 2,752,845 | 7/1956 | Lawson | 99—285 |
| 3,040,649 | 6/1962 | Day | 99—299 X |
| 3,068,777 | 12/1962 | Pedalino | 99—305 |

ROBERT W. JENKINS, *Primary Examiner.*

WALTER A. SCHEEL, *Examiner.*

S. P. FISHER, *Assistant Examiner.*